(12) United States Patent
Fukuda

(10) Patent No.: US 7,894,667 B2
(45) Date of Patent: Feb. 22, 2011

(54) IMAGE PROCESSING METHOD AND APPARATUS THEREOF

(75) Inventor: Yasuo Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 767 days.

(21) Appl. No.: 11/941,515

(22) Filed: Nov. 16, 2007

(65) Prior Publication Data

US 2008/0131021 A1    Jun. 5, 2008

(30) Foreign Application Priority Data

Dec. 5, 2006    (JP) .............................. 2006-328846

(51) Int. Cl.
*G06K 9/00* (2006.01)
*G06K 9/40* (2006.01)
(52) U.S. Cl. .................. 382/167; 382/254; 382/274
(58) Field of Classification Search .................. 382/167, 382/254, 274
See application file for complete search history.

(56) References Cited

U.S. PATENT DOCUMENTS

| 5,614,945 A | 3/1997 | Sekine et al. .......... 348/207.99 |
| 6,459,733 B1 | 10/2002 | Yokoyama et al. |
| 6,473,465 B1 | 10/2002 | Takahashi |
| 2005/0025356 A1 | 2/2005 | Fukuda ..................... 382/167 |

FOREIGN PATENT DOCUMENTS

| JP | 60-009377 U | 1/1985 |
| JP | 61-21680 | 1/1986 |
| JP | 7-115586 | 5/1995 |
| JP | 2000-059775 A | 2/2000 |
| JP | 2000-059792 A | 2/2000 |
| JP | 2000-299799 A | 10/2000 |
| JP | 2005-309127 A | 11/2005 |

OTHER PUBLICATIONS

Japanese Office Action issued Nov. 21, 2008, in Japanese Application No. 2006-328846.

*Primary Examiner*—Brian Q Le
(74) *Attorney, Agent, or Firm*—Fitzpatrick, Cella, Harper & Scinto

(57) ABSTRACT

Automatic image correction is performed for a moving image while maintaining a fade-in or fade-out effect. Hence, a frame image included in the moving image is corrected by using a correction condition for brightness which is set based on the frame image, whether or not the frame image is included in a period of a fade-in or fade-out effect is determined, and the correction of the frame image is controlled in accordance with the determination result.

4 Claims, 6 Drawing Sheets

IMAGE PROCESSING METHOD AND APPARATUS THEREOF

BACKGROUND OF THE INVENTION

1. Field of the Invention

The present invention relates to automatic image correction of a moving image.

2. Description of the Related Art

Along with the prevalence of digital cameras, opportunities for end users to handle color images have increased. However, end users are not always expert at using a digital camera. For example, results captured by a digital camera are not always satisfactory. Of course, it is possible to check a captured image using a liquid crystal display attached to a digital camera immediately after capturing and, when a user notices that the capturing has failed, he or she can capture the image again. However, a user may not check the image, or he or she may not be able to check the image because the digital camera does not have a display. Moreover, if one misses a good shutter opportunity, it may never come again.

Automatic or semiautomatic correction methods for correcting a captured image with an unsatisfactory capture result have been proposed. For example, all pixels or sampled pixels in a captured image are checked, the feature amount of the captured image is calculated, and whether the captured image is satisfactory or not is determined based on the feature amount. For the captured image determined to be unsatisfactory (under exposure, over exposure, with color cast, or the like), each pixel value of the captured image is converted in accordance with the feature amount, thereby obtaining a more satisfactory image.

Generally, a still image automatic correction process technique is designed to obtain appropriate brightness by, e.g., correcting a dark image to be brighter and suppressing the brightness of an overexposed image. This automatic correction process technique can be applied not only to still images but also to moving images.

On the other hand, for moving images, effects such as fade-in and fade-out are known wherein the brightness of an image is changed along the time axis. When the above-described still image auto correction process technique is applied to a moving image which includes special effects such as fade-in and fade-out, the process for obtaining appropriate brightness impairs the special effects such as fade-in and fade-out.

SUMMARY OF THE INVENTION

In one aspect, an image processing apparatus for performing a correction process on frame images which construct a moving image, comprising a corrector, arranged to correct a frame image, which is a portion of a movie, using a correction condition for brightness which is set based on the frame image, a determiner, arranged to determine whether or not the frame image is included in a period of a fade-in or fade-out effect, and a controller, arranged to control the correction of the frame image by the corrector in accordance with a determination result of the determiner.

According to the aspects, it is possible to perform automatic image correction for a moving image while maintaining special effects such as fade-in and fade-out.

Further features of the present invention will become apparent from the following description of exemplary embodiments with reference to the attached drawings.

DESCRIPTION OF THE EMBODIMENTS

Image processing of embodiments will be described below in detail with reference to the accompanying drawings.

First Embodiment

[Arrangement of Apparatus]

Figure 1:
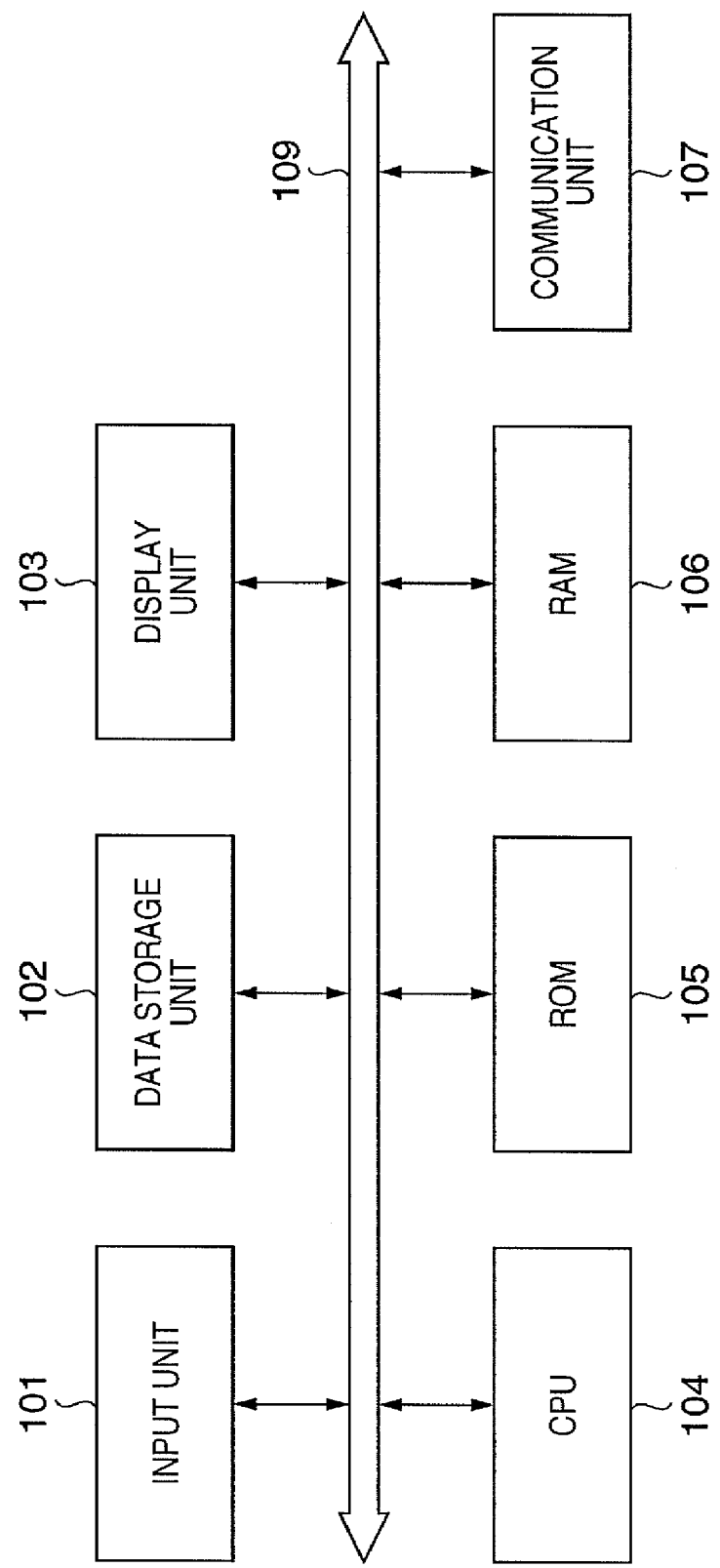
FIG. 1 is a block diagram showing the arrangement of an image processing apparatus of an embodiment.

FIG. 1 is a block diagram showing the arrangement of an image processing apparatus of an embodiment.

A microprocessor (CPU) 104 uses a random access memory (RAM) 106 as a work memory to execute a program stored in a data storage unit 102 or a read-only memory (ROM) 105; The CPU 104 controls components (to be described later) via a system bus 109 to execute image processing (to be described later). Note that the CPU 104 loads a program or data required for processing (to be described later) from the data storage unit 102 or ROM 105 into the RAM 106 and executes the program loaded into the RAM 106.

An input unit 101 is a general-purpose interface for connecting to a keyboard or pointing device for inputting a user's instruction and a data supply device. As the pointing device, a mouse, track ball, track pad, tablet, or the like can be used. As the general-purpose interface, a serial bus such as a USB (Universal Serial Bus), IEEE1394, or the like can be used. When this embodiment is applied to a digital camera, the input unit 101 which inputs a user's instruction may include a button, mode dial, or the like. Of course, the input unit 101 may be a so-called software keyboard which displays a keyboard on a display unit 103 (to be described later) by software and inputs letters and numbers by a button, mode dial, or pointing device. As the data supply device, a digital camera, digital video camera, memory card reader, or the like can be used.

The data storage unit 102, which mainly holds moving image data, includes a hard disk drive or the like. However, the data storage unit 102 may be a combination of a memory card and a card reader to which various memory cards can be connected, or a rewritable optical disk. Of course, the data storage unit 102 can store not only moving image data but also a program or other data.

A communication unit 107 is an interface for communication between devices, and uses a wire communication scheme such as a computer network, serial bus, parallel bus, telephone line, or the like. The communication unit 107 may be an interface which utilizes a wireless communication scheme such as an infrared (IrDA), IEEE802.11a/b/g, Bluetooth, UWB (ultra wide band), or the like. Various types of data and programs can be supplied from a personal computer or server apparatus via the communication unit 107.

The display unit 103 is a graphical user interface (GUI) or a cathode-ray tube (CRT) or liquid crystal panel (LCD) which displays an image after and before image processing. Note that the display unit 103 may be a monitor connected to the image processing apparatus via a cable.

[Automatic Image Correction]

Upon performing automatic image correction for a moving image, when the moving image to be corrected includes a special effect such as fade-in or fade-out, the image processing apparatus of this embodiment performs the correction without impairing the effect. There are various methods of automatic image correction, and any method may be used. Automatic image correction has as its object to correct an image so that it has appropriate brightness, and brightens a dark image or suppresses (darkens) the brightness of an over exposed image, thereby generating an image with moderate brightness as a result.

A practical example of automatic image correction will be described in detail.

First, each pixel of an image is read to generate a histogram of the luminance values of the pixels. From the luminance histogram, a shadow point (SP, luminance value Lsp) and a highlight point (HP, luminance value Lhp) are decided. In order to obtain data for black balance, average values RS, GS, and BS (see, FIG. 6) of R, G, and B of a pixel whose luminance value falls within the range from the Lsp to a luminance value Lsp' of a target shadow point are calculated. Likewise, in order to obtain data for white balance, average values RH, GH, and BE (see, FIG. 6) of R, G, and B of a pixel whose luminance value falls within the range from the Lhp to a target highlight luminance value Lhp' are calculated.

Figure 2:
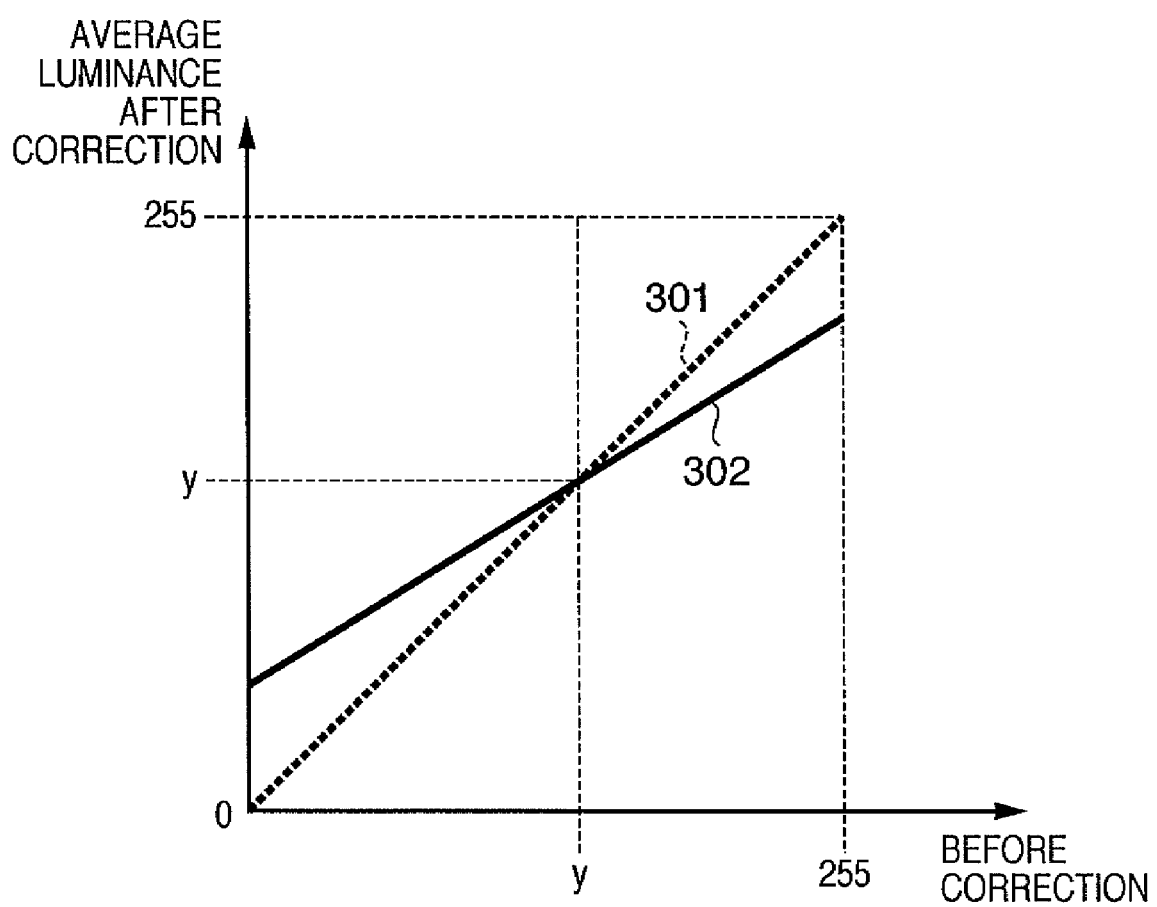
FIG. 2 is a graph for explaining a method of deciding an exposure correction amount.

Next, the average luminance of the image is calculated from the luminance histogram, and an exposure correction amount is decided in accordance with the average luminance. FIG. 2 is a graph for explaining the method of deciding an exposure correction amount, in which the abscissa plots the average luminance value of an uncorrected image and the ordinate plots the average luminance value (target luminance value) of a corrected image. A broken line 301 represents a case wherein the exposure correction amount is constantly set to 0, that is, the average luminance value of the uncorrected image is the same as that of the corrected image.

A solid line 302 represents a method of deciding the exposure correction amount, that is, the exposure correction amount set to 0 when the average luminance value of the uncorrected image equal to y. Further, the average luminance value of the corrected image is increased in comparison with that of the uncorrected image when the average luminance value of the uncorrected image is smaller than the luminance value y, on the other hand, the average luminance value of the corrected image is decreased in comparison with that of the uncorrected image when the average luminance value of the uncorrected image is larger than the luminance value y.

Figure 6:
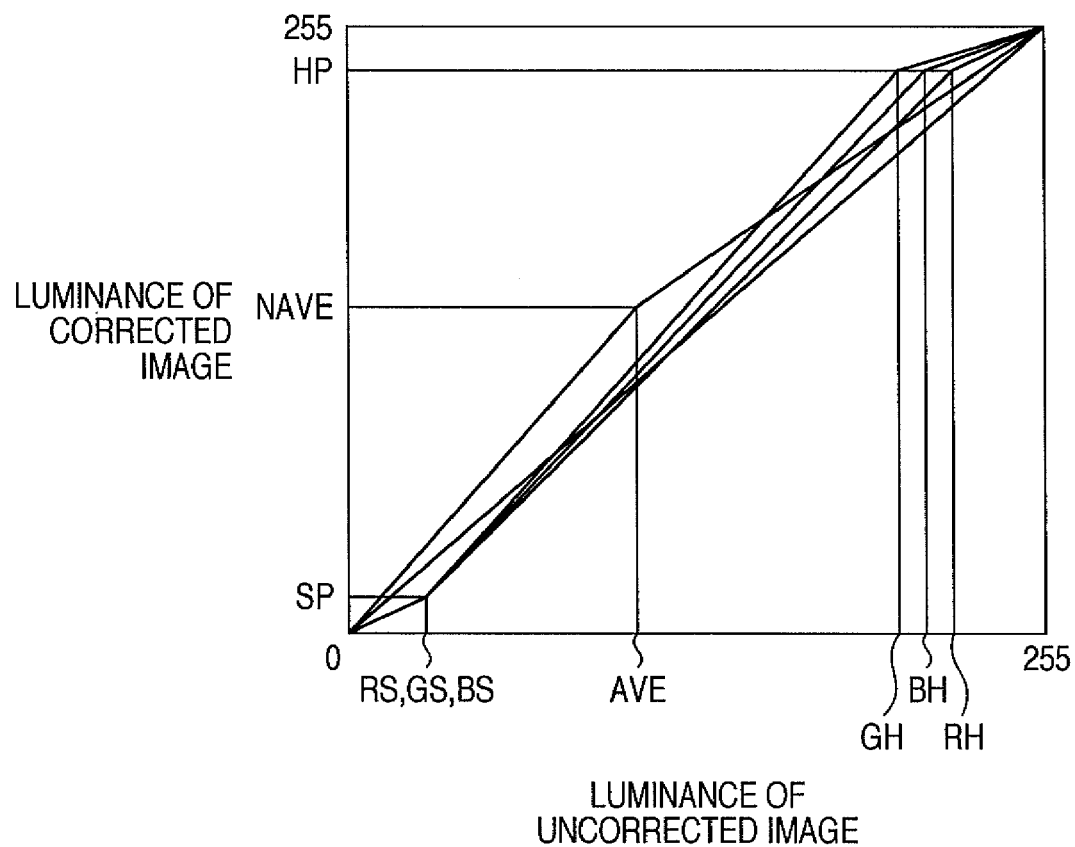
FIG. 6 is a graph for explaining an example of automatic image correction.

Next, correction characteristics of color components based on the exposure correction amount decided in this manner. As shown in FIG. 6, an average luminance value NAVE (corresponding to y on the ordinate of FIG. 2) before correction is decided with respect to an average luminance value AVE (corresponding to y on the abscissa of FIG. 2) after correction to decide the correction characteristics of the luminance value. Also, as shown in FIG. 6, the correction characteristics of respective color components are decided from the average values RS, GS, and BS and the average values RH, GH, and BH. Then, a look-up table (LUT) is generated from the decided correction characteristics, and image correction is performed on each pixel using the LUT.

As described above, the dark image region of the uncorrected image with a luminance lower than the average luminance value AVE is corrected to become bright and the bright image region with a luminance higher than the average luminance value AVE is corrected to become dark so that the image is corrected to have an approximate moderate brightness. When such automatic image correction is applied to a moving image including special effects such as fade-in and fade-out, it runs counter to the purpose of special effects such as fade-in and fade-out.

[Automatic Image Correction of Moving Image]

The image processing apparatus shown in FIG. 1 detects special effects such as fade-in and fade-out, controls an automatic image correction process in accordance with the detection result, and performs automatic image correction for a moving image while maintaining the special effects such as fade-in and fade-out.

Figure 3:
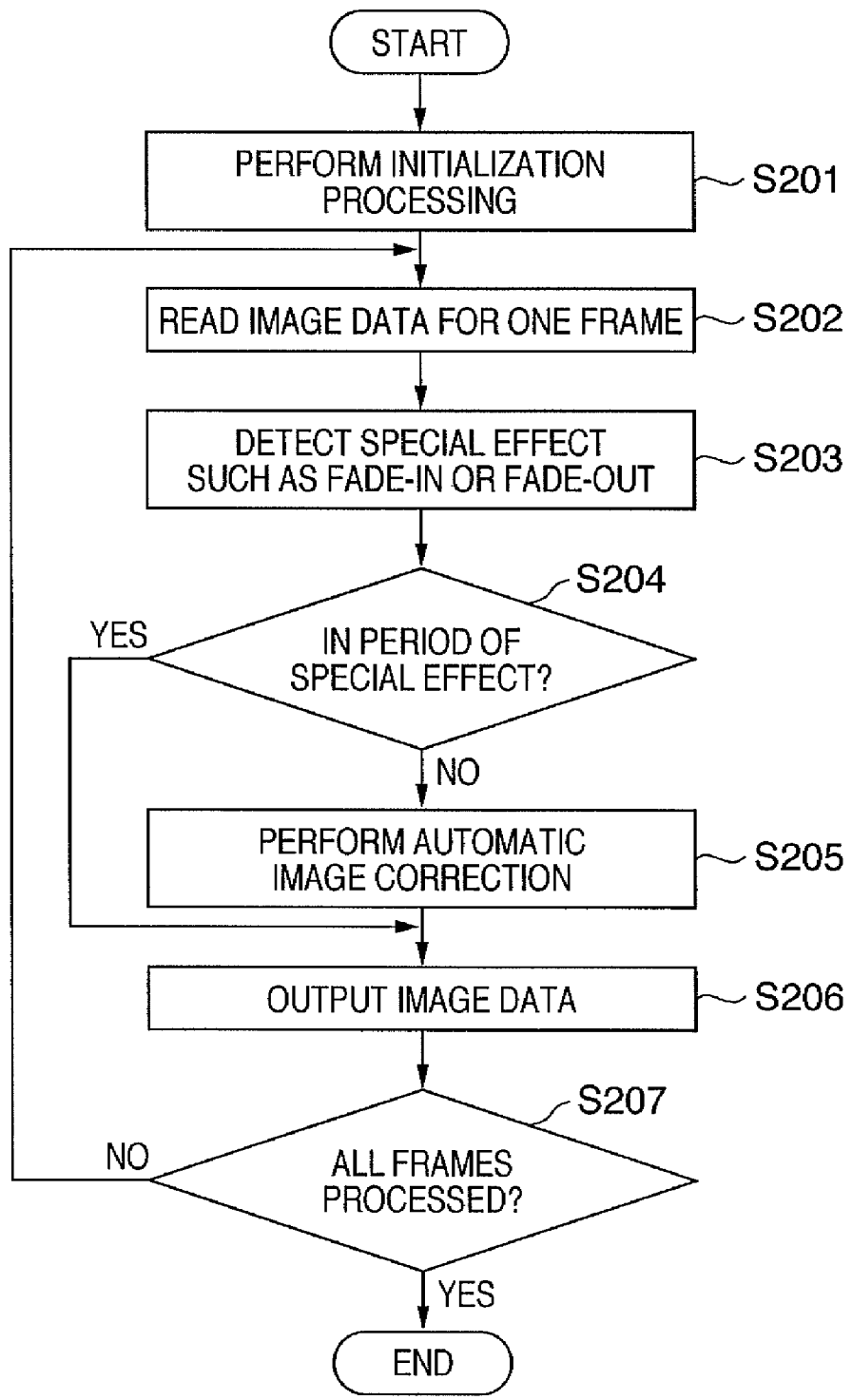
FIG. 3 is a flowchart showing the process of image processing executed by a CPU of the image processing apparatus.

FIG. 3 is a flowchart showing the process of image processing executed by the CPU 104 of the image processing apparatus.

First, the CPU 104 performs initialization processing such as initialization of variables required for the processing (S201). Of course, the CPU 104 also initializes variables required for detecting special effects such as fade-in and fade-out.

The CPU 104 reads image data for one frame from moving image data held in the data storage unit 102 (S202). Note that the data storage unit 102 holds moving image data in a predetermined format. When moving image data is compressed using an MPEG scheme or the like, image data for one frame is obtained by performing decompression processing.

The CPU 104 detects special effects such as fade-in and fade-out (S203). Special effects such as fade-in and fade-out may be detected by an arbitrary method. An example of the method of detecting the period of a special effect such as fade-in or fade-out will be described below.

First, a difference absolute sum in the spatial direction in a frame is obtained, the difference absolute sum is divided by a pixel count, thereby calculating an average pixel difference value. For example, in case of YCC data, only the difference of the luminance value Y may be used as this difference, or all differences of the luminance value Y and calorimetric values Cb and Cr may be used. Then, the difference between the average pixel difference value of a preceding frame and that of a frame of interest is calculated, and it is separated into the sign and absolute value. When the absolute value>a predetermined threshold value, the frame of interest is determined to be included in a period of fade-in or fade-out (to be referred to as "fade period", hereinafter). When the sign is minus, the frame of interest is determined to be included in a period of fade-out. When the sign is plus, the frame of interest is determined to be included in a period of fade-in.

In addition, a feature amount S of the frame whose absolute value is larger than the predetermined threshold is held and a frame count N in the fade period is counted. A rate of change D/N is calculated by dividing a difference D between the feature amount of the frame whose absolute value is larger that the predetermined threshold and that of the frame of interest by a count value N up to the frame of interest. On the other hand, a final value E of the feature amount (average pixel difference value) is estimated in accordance with fade-in or fade-out, and an estimated change amount E-C up to the fade end is calculated from the final value E and the feature amount C of the frame of interest. The estimated change amount E-C is divided by the rate of change D/N to estimate a period N(E-C)/D up to the end of the fade period.

Based on the detection result in step S203, the CPU 104 determines whether the frame of interest is included in the fade period (S204). When the CPU 104 determines that the frame of interest is not included in the fade period, it performs automatic image correction to the image data of the frame of interest (S205). When the CPU 104 determines that the frame of interest is included in the fade period, the process skips step S205 and no automatic image correction is performed. Note that since the end of the fade period can be estimated as described above, automatic image correction is not skipped after the estimated end frame of the fade period.

The CPU 104 outputs the image data of the frame of interest (S206). Accordingly, when the frame is determined to be included in the fade period in step S204, the image data read in step S202 is output. When the frame is determined not to be included in the fade period, the image data which underwent the automatic image correction in step S205 is output. Note that image data may be output by storing it in the data storage unit 102 as moving image data in a predetermined format, displaying it on the display unit 103, or transmitting it to another apparatus via the communication unit 107 or the like.

The CPU 104 determines whether all frames of the moving image data have been processed (S207). If NO in step S207, the process returns to step S202 and repeats the processing from steps S202 to S206. If YES in step S207, the process ends. Note that since moving image data is stored in the data storage unit 102 in a predetermined format, the end of the process may be determined in accordance with whether the reading process in step S202 has succeeded or not. When the reading process fails, the process may be determined to be complete. In that case, determination in step S207 is performed between steps S202 and S203. Depending on the format of moving image data, the total count of frames included in a moving image data file may be held as meta data. In this case, the CPU 104 may set the total frame count in a counter and count it down each time a frame is read in. When the counter value is 0, the CPU 104 determines that the process is complete in step S208.

Of course, when a user's instruction indicating the completion of process is input from the input unit 101, the CPU 104 may determine that the process is complete in step S208. This is effective when a moving image input unit is provided to the arrangement shown in FIG. 1 and a moving image input from the moving image input unit undergoes automatic image correction.

As described above, when automatic image correction is performed for a moving image, special effects such as fade-in and fade-out are detected and no automatic image correction is performed for a frame in a fade period. With this arrangement, automatic image correction can be performed for a moving image while maintaining special effects such as fade-in and fade-out.

Modification of Embodiment

In the above description, whether or not to perform automatic image correction is determined in accordance with whether a frame is in a period of a special effect, e.g., a fade period, or not. However, when the automatic image correction process is set to "no correction (no correction process)", it is possible not to branch the process by giving to the automatic image correction process an instruction indicating whether to perform correction or not in accordance with whether a frame is in a period of a special effect or not.

For example, after deciding correction characteristics by analyzing an image, a correction LUT corresponding to the correction characteristics is generated and image correction is performed using the correction LUT. Accordingly, during the period of a special effect, an automatic image correction process set to "no correction" can be performed by giving to the automatic image correction process an instruction indicating to use not the correction LUT but an LUT for outputting the same value as an input value.

As described above, with the arrangement which does not branch the process in accordance with whether an automatic image correction process is performed or not, the processing flow can be unified since only rewriting of a parameter is required. This is effective in implementing an automatic image correction process of a moving image in hardware.

Second Embodiment

Image processing of the second embodiment according to the present invention will be described below. Note that the same components as in the first embodiment are denoted by the same reference numerals in the second embodiment, and a detailed description will not be repeated.

In the first embodiment, an example has been described in which no automatic image correction is performed or automatic image correction is set to no correction during the period of a special effect. In case of fade-out, however, when there is a difference between a frame in which the start of fading is perceived and a frame in which the start of a fade period is detected, an observer may feel discomfort during the period corresponding to the frames having the difference. In the above-described fade-in and fade-out detection method, a shift may occur between the timing (frame) at which a human perceives the start of fading and the timing (frame) at which an apparatus detects the start of a fade period, depending on a threshold or the rate of change of fade-in or fade-out.

Figure 4:
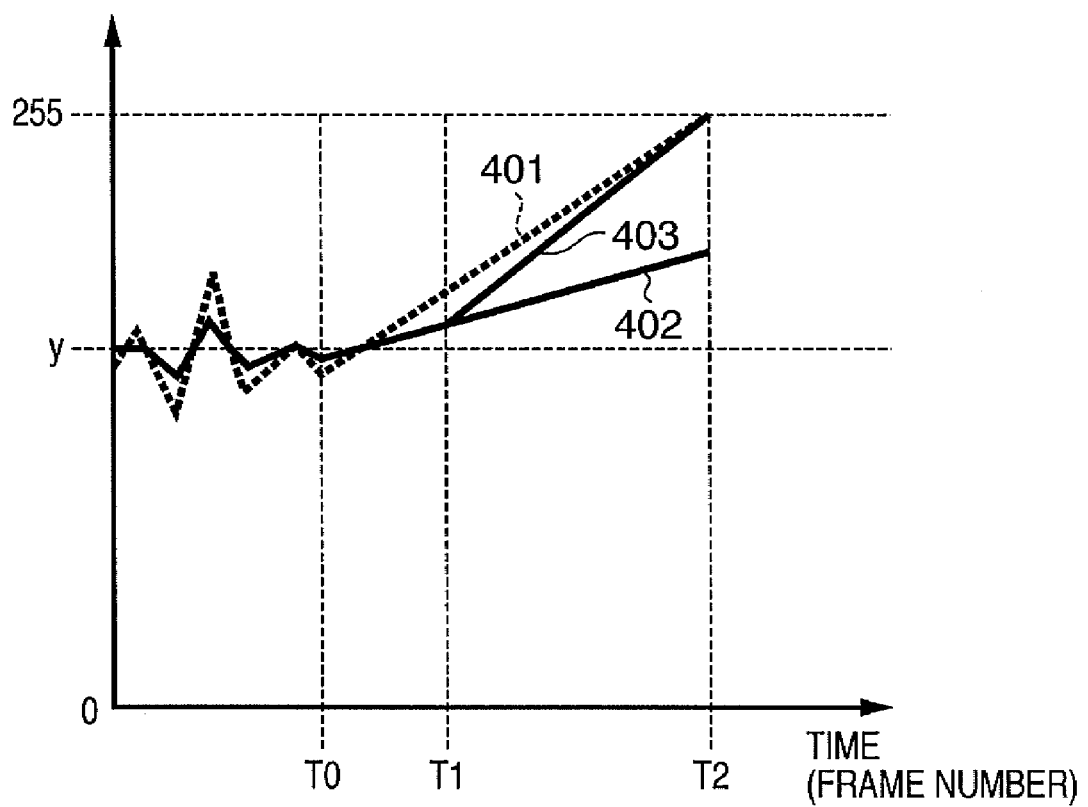
FIG. 4 is a graph for explaining the problem of a shift of fade start timing.

FIG. 4 is a graph for explaining the problem of a shift of fade start timing, wherein the abscissa plots time or the frame count and the ordinate plots the average luminance value (representative luminance value) of an image. A broken line 401 represents a change in time of the average luminance value of each frame of moving image data. A solid line 402 represents an example of the average luminance value of each frame after correction. In FIG. 4, a time T0 indicates the end time of fade-out; T2, an end time; time T1, a time at which the start of a fade period is detected.

As shown in the period between 0 to T0 in FIG. 4, by automatic image correction, the average luminance value (solid line 402) after the correction approximates to a general average luminance value y of an uncorrected frame.

When the start of a fade period is detected at the time T1, according to the first embodiment, the automatic image correction process is interrupted. Accordingly, until T1-1 immediately before the time T1, image data with an average luminance value along the solid line 402 is output. After the time T1, image data with an average luminance value along the broken line 401 is output. More specifically, between the time T1-1 and the time T1, the average luminance value jumps from the solid line 402 to the broken line 401. This causes an extreme change in brightness and that gives a feeling of discomfort to an observer. If automatic image correction is not interrupted at the time T1, image data with an average luminance value along the solid line 402 is output even after the time T1. This is against the purpose of fade-out.

In the second embodiment, after the start of a fade period is detected, image data with an average luminance value along the solid line 403 is output so that a feeling of discomfort given to an observer is resolved.

Figure 5:
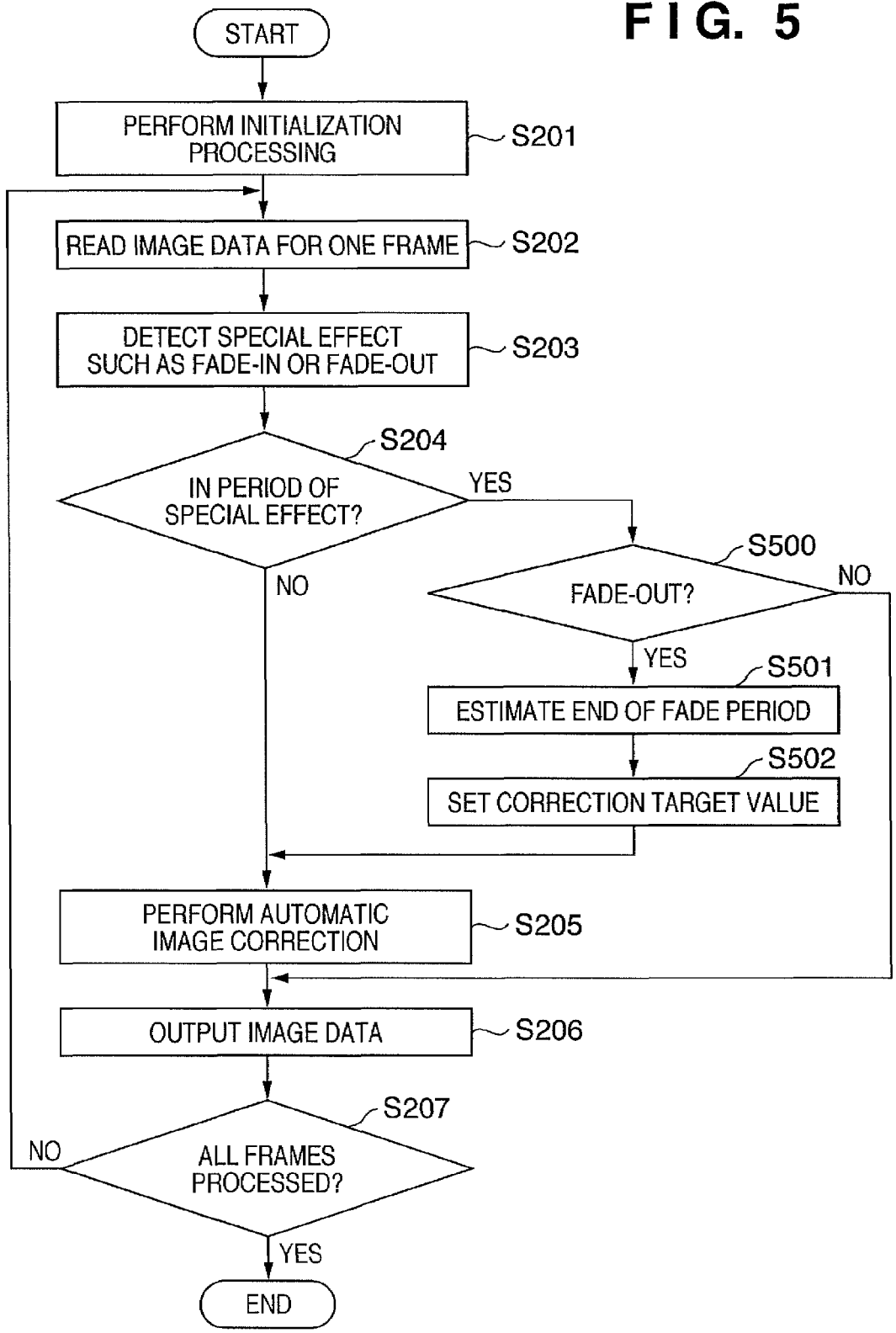
FIG. 5 is a flowchart showing the process of image processing executed by a CPU of an image processing apparatus.

FIG. 5 is a flowchart showing the process of image processing executed by a CPU 104 of an image processing apparatus. Processing from steps S500 to S502 is different from image processing shown in FIG. 3.

When the CPU 104 determines that a frame is in the period of a special effect, it determines whether the special effect is fade-out or not by the method described in the first embodiment (S500). When it is not fade-out or, in other words, when it is fade-in, the process advances to step S206 as in the first embodiment, and automatic image correction is skipped.

When it is fade-out, the CPU 104 estimates the end of the fade period by the method described in the first embodiment (S501) and sets a correction target value (S502). The process advances to step S205 to perform automatic image correction.

Upon setting the correction target value, the CPU 104 stores and uses the correction target (luminance) value used in the automatic image correction process (S205) of the preceding frame or the average luminance value of the correction result. More specifically, from the correction target luminance value of the preceding frame, the luminance value (final value E) at the end of the fade period, the current time, and the estimated end time of the fade period, the CPU 104 sets the correction target value such that it becomes an average luminance value along the solid line 403 of FIG. 4 using equation (1) below. Note that the final value E is set to, e.g., 255.

$$Yt=(Ye-Y0)/\{Te-(T-1)\}+Y0 \quad (1)$$

where Yt is the correction target value;

Te is the estimated end time (frame number) of the fade period;

T is the current time (frame number);

Ye is the luminance value (final value E) at the end of the fade period; and

Y0 is the correction target luminance value of the preceding frame or the average luminance value of the correction result.

When the correction target value is set in step S502, the CPU 104 performs automatic image correction corresponding to the correction target value in step S205.

An example in which the correction target value of the preceding frame or the average luminance value of the correction result of the preceding frame is used to set the correction target value has been described. However, any value can be used as long as it is an appropriate value for calculating the locus of the solid line 403 shown in FIG. 4. For example, a correction target (luminance) value at the time when the start of the fade period is detected or the average luminance value of the correction result may be used. In this case, the correction target value is calculated by:

$$Yt=(Ye-Ys)/(Te-Ts)\times(T-Ts)+Ys \quad (2)$$

where Ts is the detected time (frame number) of the start of the fade period; and Ys is the correction target (luminance) value at Ts or the average luminance value of the correction result.

In this manner, when fade-out is detected, automatic image correction can be performed while reproducing the fade-out without a significant change in average luminance value, thereby suppressing a feeling of discomfort given to an observer.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-328846, filed Dec. 5, 2006, which is hereby incorporated by reference herein in its entirety.

What is claimed is:

1. An image processing apparatus for reading frame images which construct a moving image, setting an image correction condition based on a representative luminance value of each frame image and a target luminance value corresponding to the representative luminance value, and performing image correction on the frame image using the image correction condition, comprising:

a detector, configured to detect a frame of a moving image included in a period of fade-in and fade-out effect;

a determiner, configured to determine whether the frame included in the period of the fade-in and fade-out effect is included in a period of the fade-in effect or a period of the fade-out effect;

a setting section, configured to set the target luminance value of the frame determined to be included in the period of the fade-out effect; and a corrector, configured to perform the image correction using the image correction condition set based on the frame image regarding the frame detected to be not included in the period of the fade-in and fade-out effect, and to perform the image correction using the image correction condition set based on the target luminance value and the representative luminance value of the frame image regarding the frame determined to be included in the period of the fade-out effect, wherein said setting section comprises:

a first section, configured to estimate a final luminance value of the fade-out effect and end timing of the period of the fade-out effect; and a second section, configured to calculate the target luminance value of a frame of interest from the final luminance value, the end timing, and the target luminance value of a previous frame or the representative luminance value of the corrected frame image, or from the target luminance value of a frame in which the start of the period of the fade-in and fade-out effect is detected or the representative luminance value of the corrected frame image, wherein the detector, the determiner, the setting section, and the corrector comprise a processor.

2. A method of reading frame images which construct a moving image, setting an image correction condition based on a representative luminance value of each frame image and a target luminance value corresponding to the representative luminance value, and performing image correction on the frame image using the image correction condition, the method comprising:

using a processor to perform the steps of:

detecting a frame of a moving image included in a period of fade-in and fade-out effect;

determining whether the frame included in the period of the fade-in and fade-out effect is included in a period of the fade-in effect or a period of the fade-out effect;

setting the target luminance value of the frame determined to be included in the period of the fade-out effect; and performing the image correction using the image correction condition set based on the frame image regarding the frame detected to be not included in the period of the fade-in and fade-out effect, and performing the image correction using the image correction condition set based on the target luminance value and the representative luminance value of the frame image regarding the frame determined to be included in the period of the fade-out effect, wherein in the setting step, a final luminance value of the fade-out effect and end timing of the period of the fade-out effect are estimated, and the target luminance value of a frame of interest is calculated from the final luminance value, the end timing, and the target luminance value of a previous frame or the representative luminance value of the corrected frame image, or from the target luminance value of a frame in which the start of the period of the fade-in and fade-out effect is detected or the representative luminance value of the corrected frame image.

3. The method according to claim 2, wherein the representative luminance value is an average luminance value of the frame image.

4. A non-transitory computer-readable storage medium storing a computer executable program for causing a computer to implement an image processing method according to claim 2.

* * * * *